US011462136B2

(12) United States Patent
Verseau et al.

(10) Patent No.: US 11,462,136 B2
(45) Date of Patent: Oct. 4, 2022

(54) SALES OR TEST DISPLAY WITH LIGHT GUIDE

(71) Applicant: DIAM INTERNATIONAL SAS, Les Mureaux (FR)

(72) Inventors: Loïc Verseau, Carrieres-sous-Poissy (FR); Stéphane Loïc Chiaretto, Sartrouville (FR); Vincent Philippe Pascal Crosville, Asnieres sur Seine (FR)

(73) Assignee: DIAM INTERNATIONAL SAS, Les Mureaux (FR)

( * ) Notice: Subject to any disclaimer, the term of this patent is extended or adjusted under 35 U.S.C. 154(b) by 24 days.

(21) Appl. No.: 17/021,135

(22) Filed: Sep. 15, 2020

(65) Prior Publication Data

US 2021/0390887 A1 Dec. 16, 2021

(30) Foreign Application Priority Data

Jun. 11, 2020 (FR) ..................................... 20 06125

(51) Int. Cl.
*G09F 13/00* (2006.01)
*G09F 13/22* (2006.01)
*G09F 13/14* (2006.01)
*G09F 13/34* (2006.01)

(52) U.S. Cl.
CPC .............. *G09F 13/22* (2013.01); *G09F 13/14* (2013.01); *G09F 13/34* (2013.01); *G09F 2013/142* (2013.01); *G09F 2013/222* (2013.01)

(58) Field of Classification Search
CPC .......... G09F 13/22; G09F 13/14; G09F 13/34; G09F 2013/142; G09F 2013/222; G09F 13/18
See application file for complete search history.

(56) References Cited

U.S. PATENT DOCUMENTS

| 9,377,578 B2* | 6/2016 | Gooden | .................. F25D 27/00 |
| 2007/0256340 A1* | 11/2007 | Kim | ........................ G09F 13/04 40/541 |
| 2015/0070928 A1* | 3/2015 | Rau | ...................... G02B 6/0081 362/604 |

* cited by examiner

*Primary Examiner* — Cassandra Davis
(74) *Attorney, Agent, or Firm* — B. Aaron Schulman, Esq.; Stites & Harbison, PLLC

(57) ABSTRACT

A sales or test display, comprising, in the assembled state, a lower level (14) for receiving products, a lighting system (16), and an upper level on which the lighting system is fastened, the lighting system comprising:
a base (24),
a printed circuit board (22) including a light-emitting diode suitable for emitting a light (L1), and
a guide (26) made from a translucent material extending along a line (L), and located opposite the light-emitting diode to conduct said light,
the guide (26) comprising:
an upper surface for downwardly reflecting at least part of the light (L1) and forming a reflected light, and
a lower surface for allowing at least part of the reflected light to pass and forming a diffused light (L3), the guide being configured to form an illuminated zone (20) on the lower level.

17 Claims, 10 Drawing Sheets

SALES OR TEST DISPLAY WITH LIGHT GUIDE

BACKGROUND OF THE INVENTION

Field of the Invention

Figure 1:
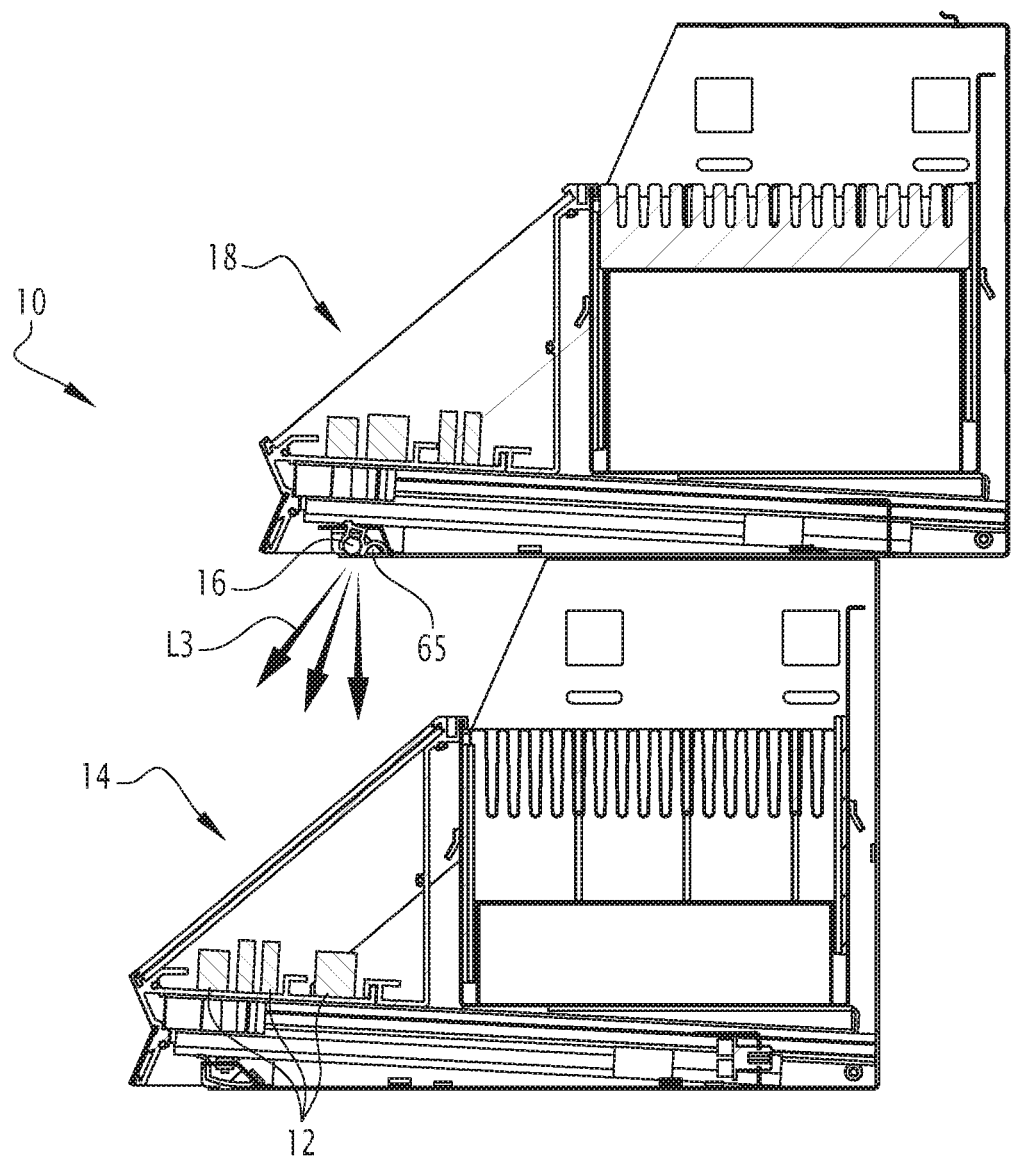

The present invention relates to a sales or test display, assembled or in a kit, comprising, in the assembled state, a lower level intended to receive products, a lighting system suitable for illuminating the products from above, and an upper level on which the lighting system is fastened. Such displays make it possible to show products to be sold or tested.

Description of Related Art

One lighting system that is currently commonly used comprises a plurality of light-emitting diodes (or LEDs), successive in a row, each of the diodes being suitable for emitting an intense white light, primarily in a solid angle forming a cone.

This type of lighting system is suitable for illuminating the products well, from the perspective of the light intensity arriving on the products. However, the illuminated zone has spots or light halos that are clearly identifiable by a user, created by each of the diodes. These spots or halos are detrimental to the esthetics of the display serving the products.

One aim of the invention is therefore to provide a display of the type described above, having technical characteristics making it possible to improve the presentation of the products.

BRIEF SUMMARY OF THE INVENTION

To that end, the invention relates to a sales or test display, assembled or in a kit, comprising, in the assembled state, a lower level intended to receive products, a lighting system suitable for illuminating the products from above, and an upper level on which the lighting system is fastened, the lighting system comprising:
  at least one base,
  at least one printed circuit board fastened on the base and including at least one light-emitting diode suitable for emitting a light, and
  a guide made from a translucent material extending from the base along a line, the guide being located opposite the light-emitting diode along the line to collect and conduct said light,
  the guide comprising:
  an upper surface suitable for downwardly reflecting at least part of the light located inside the guide and forming a reflected light, and
  a lower surface (58) suitable for allowing at least part of the reflected light to pass and forming a diffused light, the guide being configured to form an illuminated zone on the lower level.

According to specific embodiments, the display includes one or more of the following features, considered alone or according to any technically possible combination(s):
  the guide is configured so that the illuminated zone is free of a plurality of spots and a plurality of halos separate from one another to the naked eye;
  the guide comprises polycarbonate, polymethyl methacrylate or glass;
  the upper surface defines protuberances or grooves forming a plurality of flat diopters;
  the upper surface includes a white reflective paint or a white reflective serigraphy;
  the printed circuit is movable relative to the base between a disassembled position, in which the printed circuit board is separated from the base, and an assembled position, in which the printed circuit board is fastened on the base;
  the printed circuit board comprises a first plate on which the light-emitting diode is fastened, and the base comprises a second plate extending in a plane perpendicular to the line and parallel to the first plate in the assembled position, and a first pin and a second pin protruding from the first plate along the line and located on the other side of the second plate relative to the guide along the line, the first pin and the second pin being suitable for being received in the assembled position respectively in a first notch and a second notch defined by a peripheral edge of the first plate;
  the guide comprises a reflective surface located at an end opposite the base along the line, the reflective surface being suitable for reflecting at least part of said light located inside the guide and forming a second reflected light propagating in the opposite direction along the line relative to said light;
  the line is straight;
  in the assembled state, the lighting system comprises: a second printed circuit board having a second light-emitting diode, and a second base from which the guide extends along the line, the second printed circuit board being fastened on the second base, and the guide being located opposite the second light-emitting diode along the line;
  the lighting system comprises one or two light-emitting diodes located at the guide ends along the line,
  the base or the printed circuit board comprises studs suitable for positioning the base relative to the printed circuit board in the assembled state of the display,
  the printed circuit board comprises a heat sink,
  the guide has, perpendicular to the line, a generally circular section, with or without flat, or an elliptical, rectangular, square or trapezoidal section,
  the largest dimension of the section is inclusively between 2 mm and 16 mm, for example between 6 and 8 mm,
  the guide is further fastened on the second level by clips or clamping collars, for example made from metal or plastic,
  the guide is rigid,
  the guide is flexible, and
  the line is curved or defines one or several angles.

BRIEF DESCRIPTION OF THE SEVERAL VIEWS OF THE DRAWING(S)

Figure 2:
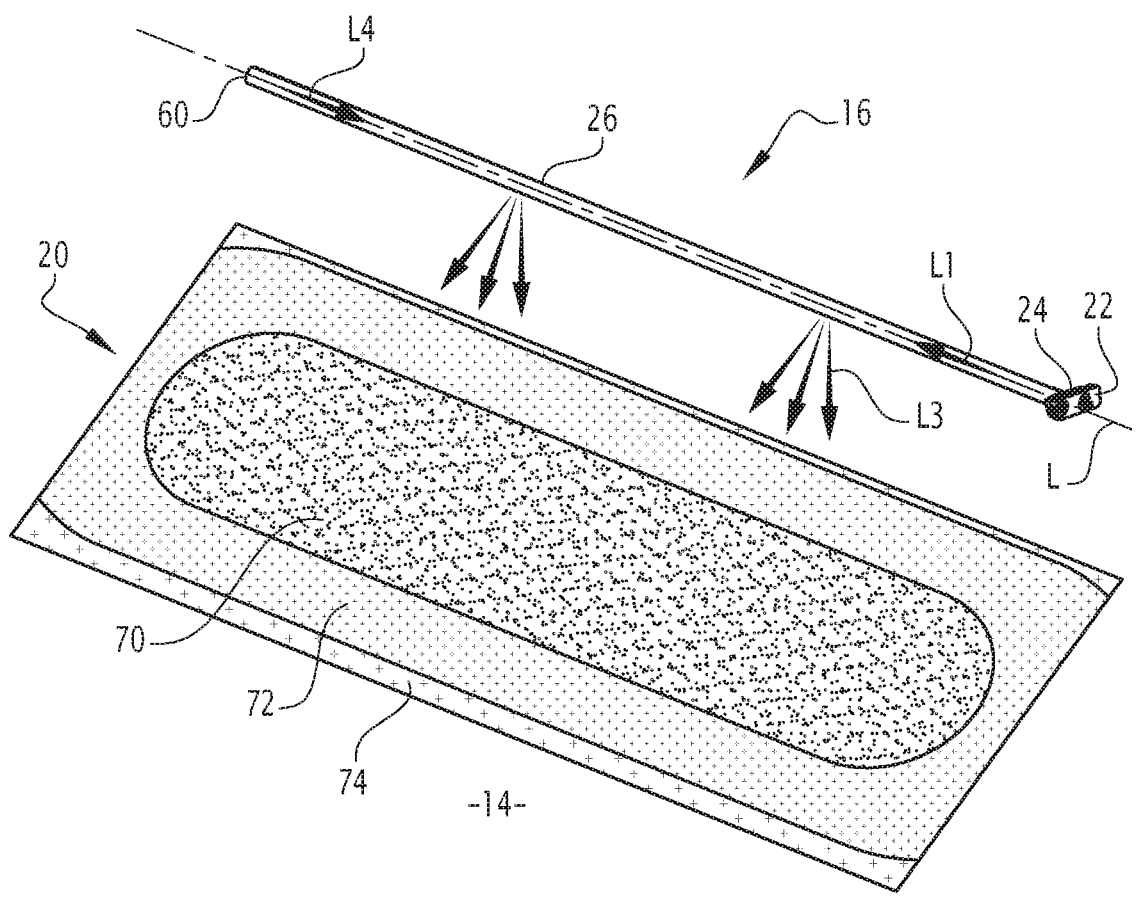
Figure 3:
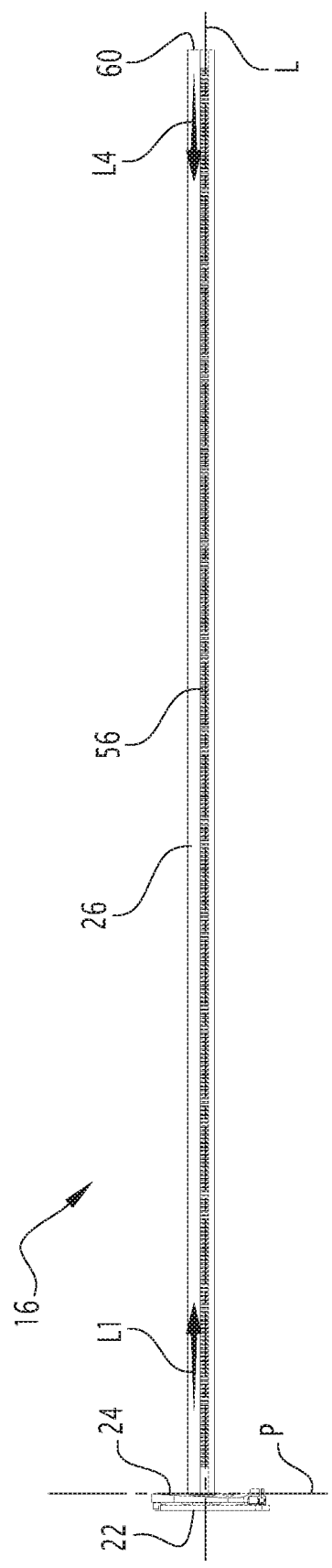
Figure 4:
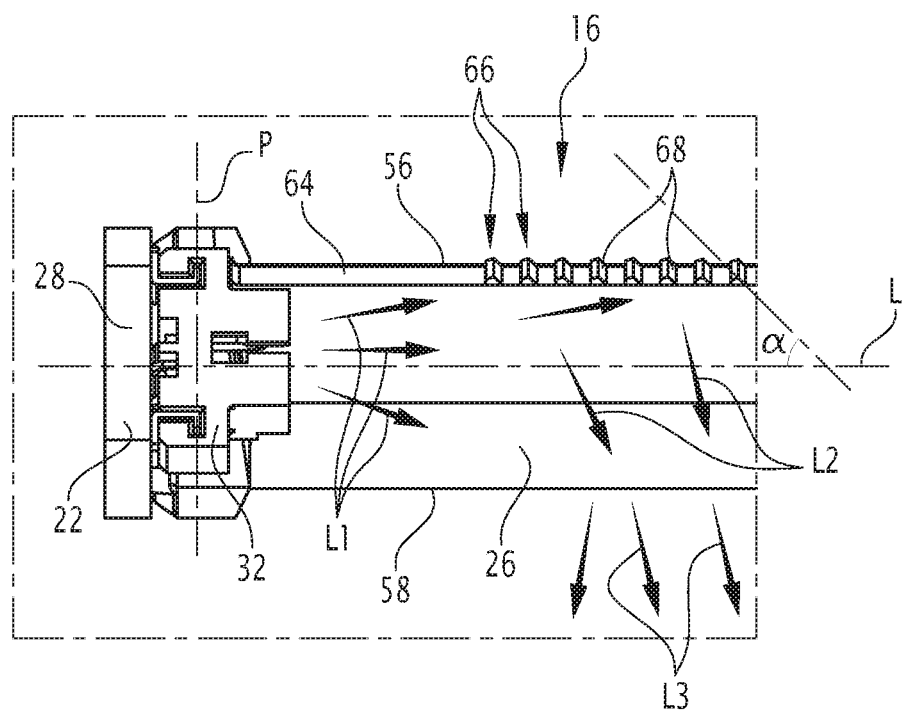
Figure 5:
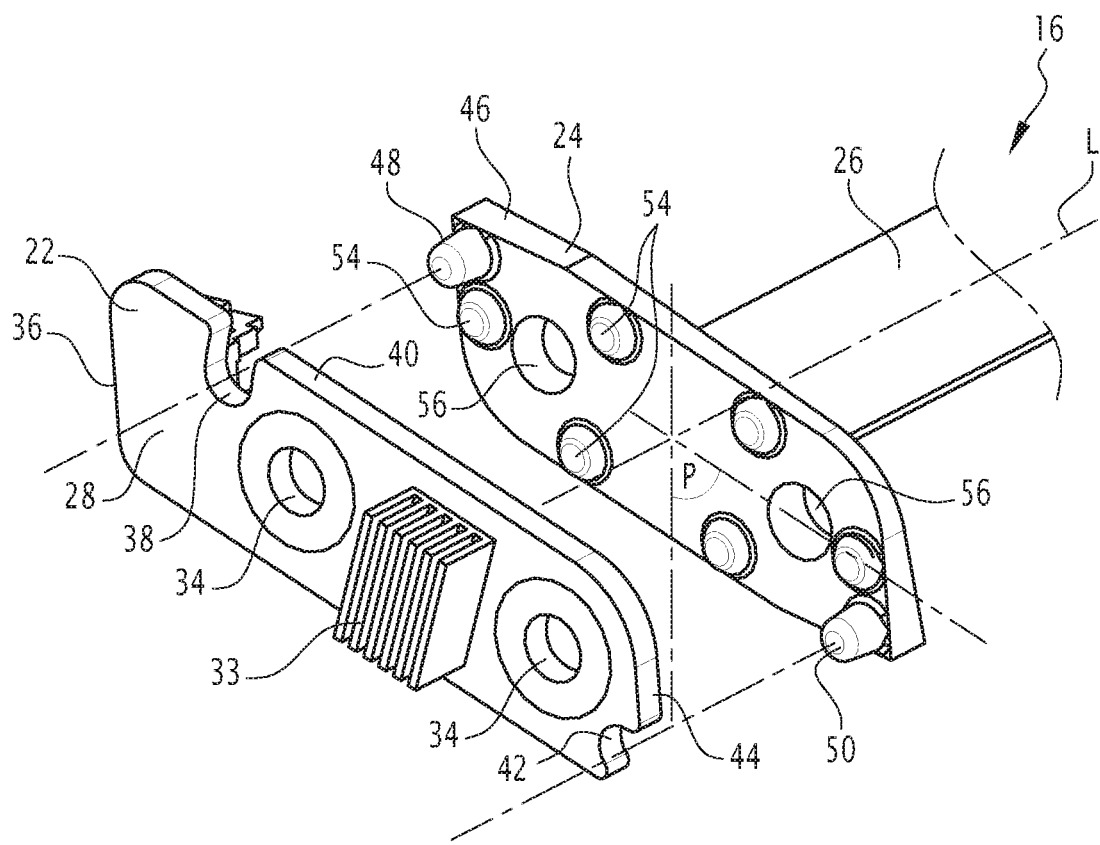
Figure 6:
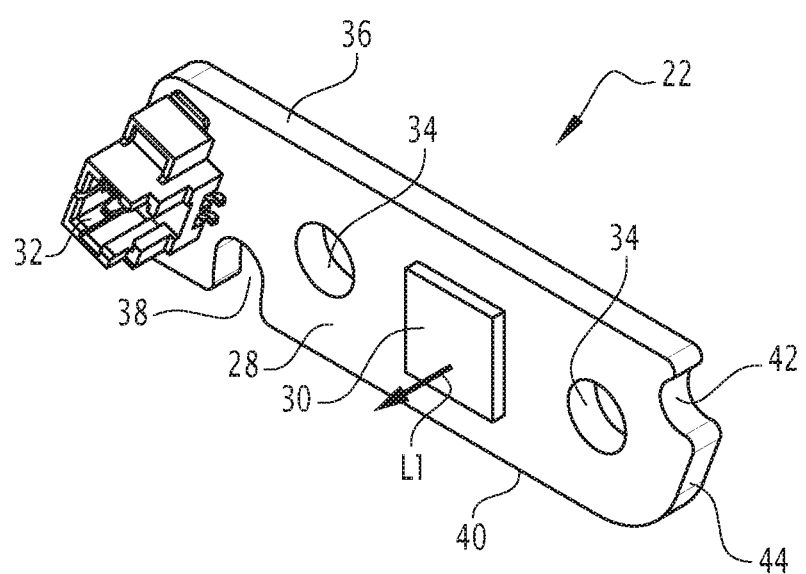
Figure 7:
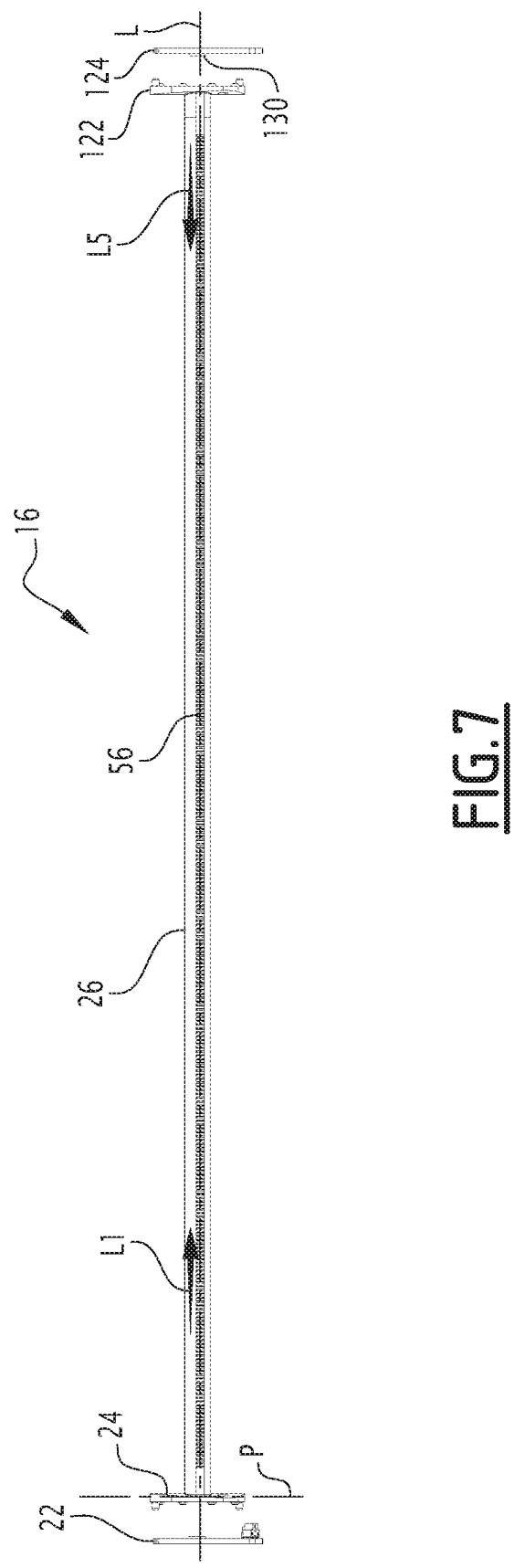

The invention will be better understood upon reading the following description, provided solely as an example, and done in reference to the appended drawings, in which:

FIG. 1 is a schematic, vertical sectional view of a display according to the invention, in the assembled state, FIG. 2 is a schematic perspective view of a lighting system of the display shown in FIG. 1, and of an illuminated zone on the lower level, FIG. 3 is a top view of the lighting system shown in FIGS. 1 and 2, FIG. 4 is a side view of one end of the lighting system shown in FIGS. 1 to 3, this end comprising a base mounted on a printed circuit board, FIG. 5 is a perspective view of the end shown in FIG. 4, the base being separated from the printed circuit board, FIG. 6 is a perspective view of the printed circuit board shown in FIGS. 2 to 5, the printed circuit board being seen from the side comprising a light-emitting diode, FIG. 7 is a top view of a lighting system making up a first variant of the lighting system shown in FIGS. 1 to 5, FIG. 8 is a top view of a lighting system making up a second variant of the lighting system shown in FIGS. 1 to 5, FIG. 9 is a top view of a lighting system making up a third variant of the lighting system shown in FIGS. 1 to 5, and FIG. 10 is a schematic view of different variants of the guide, shown in section perpendicular to the line.

DETAILED DESCRIPTION OF THE INVENTION

A display 10 according to the invention is described in reference to FIG. 1. In this figure, the display 10 is in the assembled state. The display 10 is intended to show a user (not shown) products 12 to be sold or tested.

In a variant that is not shown, the display 10 is in a kit, that is to say in the unassembled state, in detached parts advantageously packaged in wrappings (not shown).

In the example, the display 10 comprises a lower level 14 receiving the products 12, a lighting system 16 suitable for illuminating the products from above, and an upper level 18 on which the lighting system is fastened.

According to variants that are not shown, the display 10 can comprises more than two levels. According to one of these variants, the upper level 18 also comprises products, illuminated from a third level located above the upper level 18.

Within the meaning of the present invention, "upper" means that the upper level 16 is located above the lower level 14 when the display 10 is in a normal usage position.

The lower level 14 advantageously forms a shelf or a drawer intended to receive the products 12.

The upper level 18 is advantageously similar to the first level 14, except that it also serves as support for the lighting system 16.

As visible in FIG. 2, the lighting system 16 is suitable for forming an illuminated zone 20 on the lower level 14.

As visible in FIGS. 2 to 4, the lighting system 16 comprises a printed circuit board 22, a base 24, and a guide 26 made from translucent material extending from the base along a line L.

In the example, the line L is straight and advantageously horizontal in the normal usage position of the display 10.

The printed circuit board 22 is fastened on the base 24. The printed circuit board 22 comprises a first plate 28 serving as support, a light-emitting diode 30 fastened on the first plate, and a connector 32.

Advantageously, the printed circuit board 22 also comprises a heat sink 33.

The first plate 28 for example includes two orifices 34 making it possible to fasten the printed circuit board 22 on the base 24 using two screws, two rivets or two clips (not shown).

The first plate 28 advantageously includes a peripheral edge 36 defining a first notch 38, for example located on a large side 40 of the first plate, and a second notch 42, for example located on a small side 44.

The light-emitting diode 30 is for example of the surface-mounted component (SMC) type.

The printed circuit 22 is advantageously movable relative to the base 24 between a disassembled position (shown in FIG. 6), in which the printed circuit board is separated from the base, and an assembled position (shown in FIGS. 3 and 4), in which the printed circuit board is fastened on the base.

The base 24 for example includes a second plate 46 extending in a plane P perpendicular to the line L and parallel to the first plate 28 in the assembled position. The base 24 advantageously comprises a first pin 48 and a second pin 50 protruding from the second plate along the line L and located on the other side of the plate relative to the guide 26 along the line L, the first pin and the second pin being suitable for being received in the assembled position respectively in the first notch 38 and the second notch 42.

The base 24 is for example made from the same material as the guide 26. The base 24 is advantageously integral with the guide 26.

The base 24 advantageously includes a plurality of studs 54 on which the printed circuit board 22 is placed in the assembled position to ensure a predetermined placement of the base relative to the printed circuit board in the assembled position.

According to a variant that is not shown, the studs 54 are formed by the printed circuit board 22 and cooperate with the base 24.

The second plate 46 for example includes two orifices 56 that are aligned with the orifices 34 of the first plate 28 in the assembled position, so as to allow the fastening of the printed circuit board 22 on the base 24.

In the assembled position, the guide 26 is located opposite the light-emitting diode 30 along the line L to collect and conduct a light L1 emitted by the light-emitting diode.

The guide 26 is configured to form the illuminated zone 20 on the lower level 14 from the light L1.

The guide 26 is configured so that the illuminated zone 20 is free of a plurality of spots and a plurality of halos separate from one another to the naked eye. Such spots or halos would form if the lower level 14 was illuminated directly by a plurality of light-emitting diodes.

The guide 26 comprises one or several optical-grade materials, advantageously allowing a light transmission, as determined according to standard ISO 13468-2 of 2006, greater than or equal to 80%, preferably greater than or equal to 90%. The light transmission permitted by the guide 26 is advantageously at least equal to that of the window glass.

For example, the guide 26 comprises polycarbonate, polymethyl methacrylate or glass. According to one particular embodiment, the guide 26 is made up of one of these materials, the base 24 for example forming an endpiece integral with the guide.

In the example, the guide 26 is rigid.

As visible in FIG. 4, the guide 26 comprises, in the normal usage position, an upper surface 56 suitable for downwardly reflecting at least part of the light L1 located inside the guide and forming a reflected light L2. The guide 26 comprises a lower surface 58 suitable for allowing at least part of the reflected light L2 to pass and forming a diffused light L3 in turn forming the illuminated zone 20.

Advantageously, the guide 26 comprises a reflective surface 60 (FIG. 3) located at an end opposite the base 24 along the line L, the reflective surface 60 being suitable for reflecting at least part of the light L1 located inside the guide and forming a second reflected light L4 propagating in the opposite direction along the line L.

Figure 10:
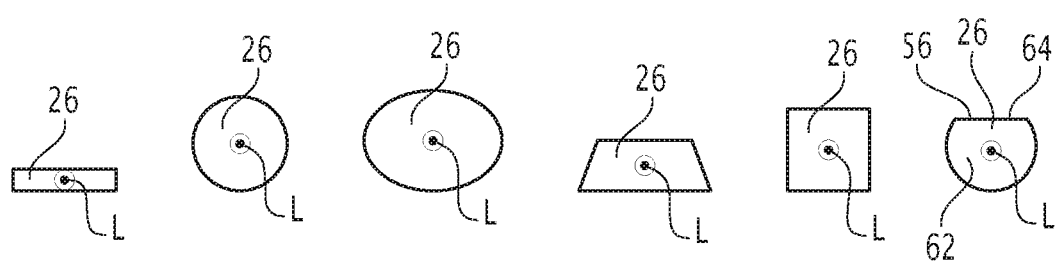

For example, the guide 26 has, perpendicular to the line L, a generally circular section 62, forming a flat 64 (FIG. 4 and FIG. 10 on the right).

The guide 26 is advantageously secured with the upper level 18 owing to one or several clips 65 (FIG. 1) or clamping collars, for example made from metal or plastic.

The largest dimension D of the section 62 is for example inclusively between 2 mm and 16 mm, preferably between 6 mm and 8 mm.

According to one particular embodiment, the upper surface 56 defines protuberances 66 (FIG. 4) or grooves forming a plurality of flat diopters 68 respectively having a plurality of inclines α relative to the line L, the inclines advantageously varying relative to one another along the line L. This makes it possible to adjust the quantity of reflected light L2 and diffused light L3 along the line L.

According to one particular embodiment, the upper surface 56 bears a white reflective paint or a white reflective serigraphy.

The protuberances 66 or the grooves are for example oriented perpendicular to the line L.

The illuminated zone 20 is advantageously homogeneous. In the illuminated zone 20, an intensely illuminated oblong central part 70 is shown, surrounded by a first peripheral part 72 that is slightly less illuminated, and a second peripheral part 74 that is even less illuminated. The central part 70 is the only spot of the illuminated zone 20. To the naked eye, an observer does not detect other spots. This observer also does not detect a plurality of halos. The illuminated zone 20 does not result from light projection cones created by a plurality of diodes, but a continuous diffusion of light along the line L by the guide 26.

To assemble the display 10, the lower level 14 and the upper level 18 are assembled (FIG. 1) in a manner known in itself.

Then, the printed circuit board 22 is taken from the disassembled position (FIG. 6) to the assembled position (FIGS. 3 and 4). The first pin 48 is engaged in the first notch 38 (FIG. 4) and the second pin 50 enters the second notch 42. The first plate 28 comes into contact with the studs 54. Advantageously, the studs 54 very precisely fix the relative position of the base 24 with respect to the printed circuit board 22, and in particular relative to the light-emitting diode 30, so that the guide 26 is perfectly opposite the latter.

Next, the printed circuit board 22 is fastened on the base 24, for example owing to push rivets engaged in the orifices 34 of the first plate 28 and in the orifices 56 of the second plate 46.

The fastening of the illumination system 16 is for example finalized by fastening the guide 26 on the upper level 18 using clips 65.

The operation of the display 10 results from its structure and will now be briefly described.

The display 10 is in the assembled state. The products 12 are optionally placed on the lower level 14 and are illuminated from above by the lighting system 16.

Other products are optionally placed on the upper level 18. These products are for example illuminated by another level, not shown, or by the ambient light.

During operation, the light-emitting diode 30 emits the light L1 (FIGS. 2, 3, 4 and 6), which enters the guide 26.

The light L1 propagates in the guide 26. The upper surface 56 downwardly reflects at least part of the light L1 and forms the reflected light L2 (FIG. 4).

The lower surface 58 allows at least part of the reflected light L2 to pass and forms the diffused light L3.

By falling on the lower level 14 or on the products 12, the diffused light L3 forms the illuminated zone 20.

The optional reflective surface 60 returns, in the opposite direction along the line L, the light L1 that has not left the guide 26, and forms the second reflected light L4. The second reflected light L4 is also reflected by the upper surface 56 and diffused by the lower surface 58.

Owing to the above features, the display 10 creates a more pleasant illuminated zone for an observer, unlike what would happen with a plurality of diodes mounted in a line. Owing to its technical features, the display 10 therefore improves the presentation of the products 12.

Advantageously, the display 10 makes it possible to create an illuminated zone 20 with a homogeneous and smooth appearance for the observer.

Furthermore, the display 10, using only a single diode in the example above, allows significant energy savings. Its environmental impact is also reduced, since the consumption of a single light-emitting diode is low.

The optional feature according to which the upper surface 56 forms the protuberances 66 makes it possible to modulate the diffused light L3 and for example to [give] it a substantially constant intensity along the line L.

We will now describe several variants of the display 10. These variants remain similar to the display described above in reference to FIGS. 1 to 6. The similar elements bear the same numerical references and will not described again. Only the differences will be described in detail below.

According to a first variant shown in FIG. 7, the display 10 does not comprise the reflective surface 60. The display 10 comprises a second printed circuit 122 and a second base 124 located at the opposite end of the guide 26 relative to the base 24.

The second printed circuit board 122 and the second base 124 are advantageously structurally similar to the printed circuit board 22 and the base 24, and work similarly. The second printed circuit board 122 is fastened on the second base 124.

The second printed circuit board 122 comprises a second light-emitting diode 130 suitable for emitting a second light L5 that enters the guide 26 and propagates there in the opposite direction relative to the light L1. The second light L5 is reflected by the upper surface 56 and diffused by the lower surface 58 and contributes to forming the illuminated zone 20.

Figure 8:
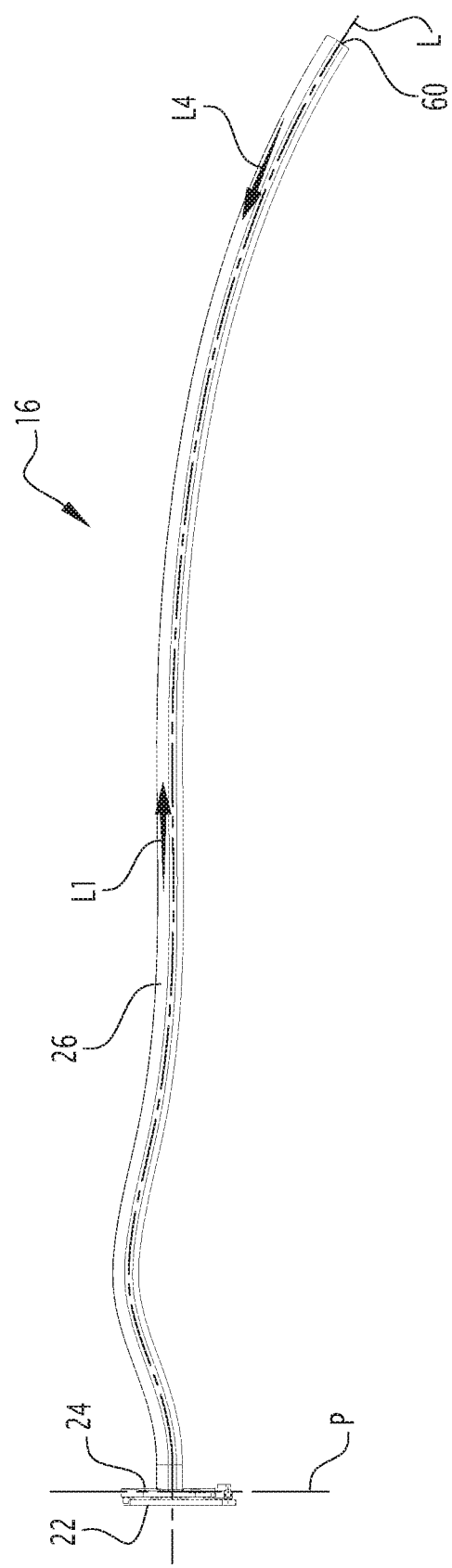

According to a second variant shown in FIG. 8, the line L is not straight, but curved. The line L is for example flat.

According to another example, the line L is warped.

According to one particular embodiment, the guide 26 is not rigid, but flexible, which makes it possible to give the desired shape to the line L and to adapt the lighting system 16 to the circumstances.

Figure 9:
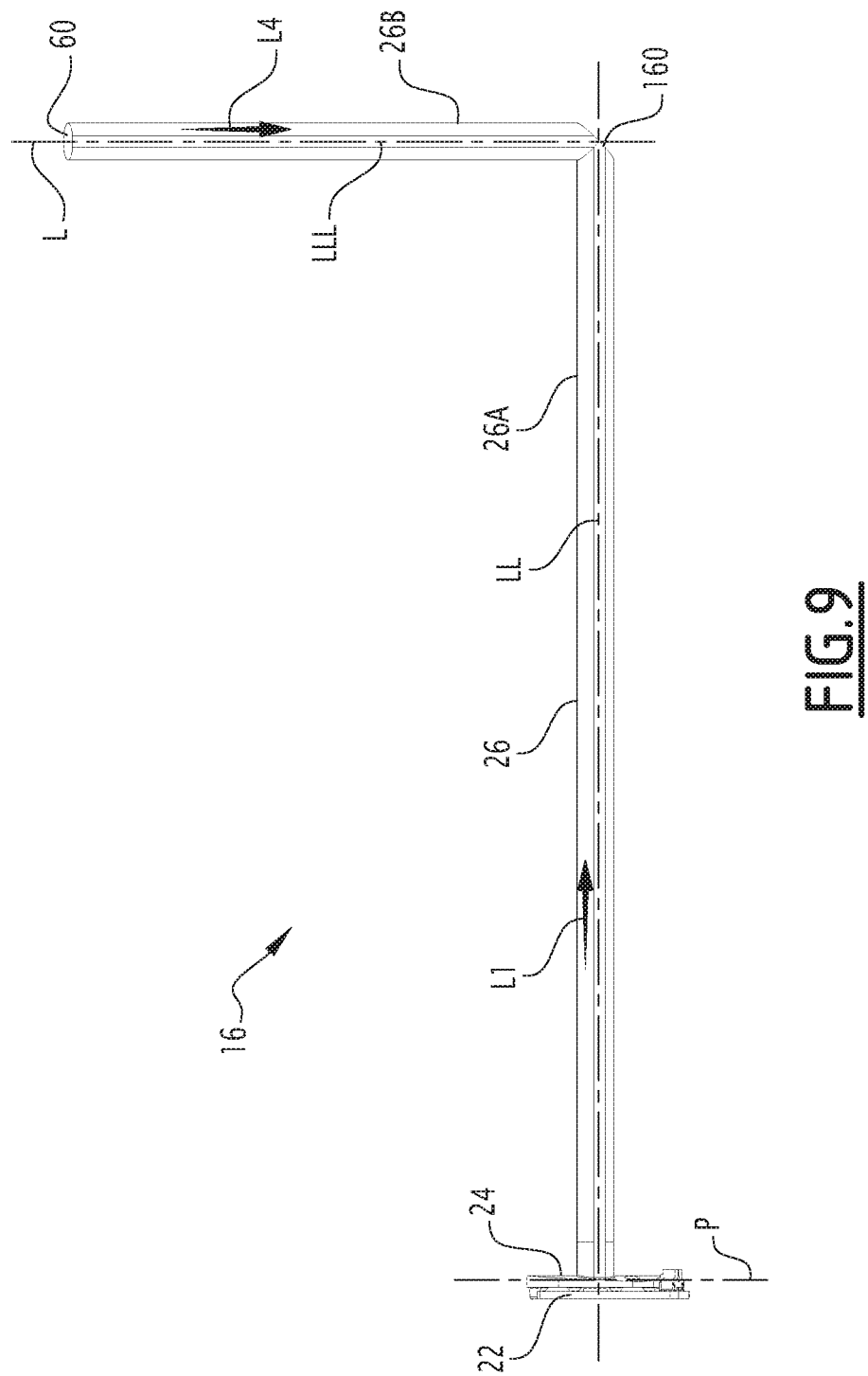

According to a third variant shown in FIG. 9, the line L is not straight, but broken, that is to say straight in pieces. In the example, the line L includes two straight pieces LL and LLL, for example forming a right angle between them.

The guide 26 comprises two parts 26A and 26B extending along the pieces LL and LLL.

Between the parts 26A and 26B, the guide 26 includes a reflective surface 160 suitable for the light L1 arriving from the part 26A to be guided in the part 26B, and advantageously conversely for the light arriving in the part 26B to be guided in the part 26A.

According to other embodiments, the line L is broken into more than two parts, forming several angles between them, for example any angles.

According to variants shown in FIG. 10, the section 62 of the guide 26 does not have a general circular shape with the flat 64. From left to right in FIG. 10, the section 62 is for example rectangular, circular with no flat, elliptical, trapezoidal or square. Other shapes are possible.

The invention claimed is:

1. A sales or test display comprising, in the assembled state, a lower level for receiving products, a lighting system capable of illuminating the products from above, and an upper level on which the lighting system is fastened, the lighting system comprising:
   at least one base,
   at least one printed circuit board fastened on the base and including at least one light-emitting diode suitable for emitting a light, and
   a guide comprising a translucent material extending from the base along a line, the guide facing the light-emitting diode along the line to collect and conduct said light,
   the guide further comprising:
   an upper surface suitable for downwardly reflecting at least part of the light located inside the guide and forming a reflected light, and
   a lower surface allowing at least part of the reflected light to pass and forming a diffused light, the guide being configured to form an illuminated zone on the lower level,
   wherein the upper surface defines protuberances or grooves forming a plurality of flat diopters or wherein the upper surface includes a white reflective paint or a white reflective serigraphy.

2. The display according to claim 1, wherein the guide comprises polycarbonate, polymethyl methacrylate or glass.

3. The display according to claim 1, wherein the printed circuit is movable relative to the base between a disassembled position, in which the printed circuit board is separated from the base, and an assembled position, in which the printed circuit board is fastened on the base.

4. The display according to claim 3, wherein:
   the printed circuit board comprises a first plate on which the light-emitting diode is fastened, and
   the base comprises a second plate extending in a plane perpendicular to the line and parallel to the first plate in the assembled position, and a first pin and a second pin protruding from the first plate along the line and located on the other side of the second plate relative to the guide along the line, the first pin and the second pin being suitable for being received in the assembled position respectively in a first notch and a second notch defined by a peripheral edge of the first plate.

5. The display according to claim 1, wherein the guide comprises a reflective surface located at an end opposite the base along the line, the reflective surface being suitable for reflecting at least part of said light located inside the guide and forming a second reflected light propagating in the opposite direction along the line relative to said light.

6. The display according to claim 1, wherein the line is straight.

7. The display according to claim 1, wherein, in the assembled state, the lighting system comprises:
   a second printed circuit having a second light-emitting diode, and
   a second base from which the guide extends along the line, the second printed circuit board being fastened on the second base, and the guide facing the second light-emitting diode along the line.

8. The display kit according to claim 1, wherein the printed circuit is movable relative to the base between a disassembled position, in which the printed circuit board is separated from the base, and an assembled position, in which the printed circuit board is fastened on the base.

9. The display kit according to claim 8, wherein:
   the printed circuit board comprises a first plate on which the light-emitting diode is fastened, and
   the base comprises a second plate extending in a plane perpendicular to the line and parallel to the first plate in the assembled position, and a first pin and a second pin protruding from the first plate along the line and located on the other side of the second plate relative to the guide along the line, the first pin and the second pin being suitable for being received in the assembled position respectively in a first notch and a second notch defined by a peripheral edge of the first plate.

10. The display kit according to claim 1, wherein the guide comprises a reflective surface located at an end opposite the base along the line, the reflective surface being suitable for reflecting at least part of said light located inside the guide and forming a second reflected light propagating in the opposite direction along the line relative to said light.

11. A sales or test display comprising, in the assembled state, a lower level for receiving products, a lighting system capable of illuminating the products from above, and an upper level on which the lighting system is fastened, the lighting system comprising:
    at least one base,
    at least one printed circuit board fastened on the base and including at least one light-emitting diode suitable for emitting a light, and
    a guide made from a translucent material extending from the base along a line, the guide facing the light-emitting diode along the line to collect and conduct said light,
    the guide comprising:
    an upper surface suitable for downwardly reflecting at least part of the light located inside the guide and forming a reflected light, and
    a lower surface suitable for allowing at least part of the reflected light to pass and forming a diffused light, the guide being configured to form an illuminated zone on the lower level,
    wherein the printed circuit is movable relative to the base between a disassembled position, in which the printed circuit board is separated from the base, and an assembled position, in which the printed circuit board is fastened on the base, and
    wherein the printed circuit board comprises a first plate on which the light-emitting diode is fastened, and the base comprises a second plate extending in a plane perpendicular to the line and parallel to the first plate in the assembled position, and a first pin and a second pin protruding from the first plate along the line and located on the other side of the second plate relative to the guide along the line, the first pin and the second pin being suitable for being received in the assembled position respectively in a first notch and a second notch defined by a peripheral edge of the first plate.

12. A sales or test display comprising, in the assembled state, a lower level for receiving products, a lighting system capable of illuminating the products from above, and an upper level on which the lighting system is fastened, the lighting system comprising:
    at least one base,
    at least one printed circuit board fastened on the base and including at least one light-emitting diode suitable for emitting a light, and a guide made from a translucent material extending from the base along a line, the guide facing the light-emitting diode along the line to collect and conduct said light, the guide comprising:
an upper surface suitable for downwardly reflecting at least part of the light located inside the guide and forming a reflected light, and
a lower surface suitable for allowing at least part of the reflected light to pass and forming a diffused light, the guide being configured to form an illuminated zone on the lower level,
wherein, in the assembled state, the lighting system comprises:
a second printed circuit having a second light-emitting diode, and
a second base from which the guide extends along the line, the second printed circuit board being fastened on the second base, and the guide facing the second light-emitting diode along the line.

13. An unassembled sales or test display kit, comprising a lower level for receiving products, a lighting system for illuminating the products from above, and an upper level on which the lighting system is fastened, the lighting system comprising:
at least one base,
at least one printed circuit board fastened on the base and including at least one light-emitting diode suitable for emitting a light, and
a guide comprising a translucent material extending from the base along a line, the guide facing the light-emitting diode along the line to collect and conduct said light, the guide further comprising:
an upper surface suitable for downwardly reflecting at least part of the light located inside the guide and forming a reflected light, and
a lower surface allowing at least part of the reflected light to pass and forming a diffused light, the guide being configured to form an illuminated zone on the lower level,
wherein the upper surface defines protuberances or grooves forming a plurality of flat diopters or wherein the upper surface includes a white reflective paint or a white reflective serigraphy.

14. The display kit according to claim 13, wherein the guide comprises polycarbonate, polymethyl methacrylate or glass.

15. The display kit according to claim 13, wherein the upper surface includes a white reflective paint or a white reflective serigraphy.

16. The display according to claim 13, wherein the line is straight.

17. The display kit according to claim 13, wherein the lighting system comprises:
a second printed circuit having a second light-emitting diode, and
a second base from which the guide extends along the line, the second printed circuit board being fastened on the second base, and the guide facing the second light-emitting diode along the line.

* * * * *